(12) United States Patent
Humphrey

(10) Patent No.: US 6,659,191 B1
(45) Date of Patent: Dec. 9, 2003

(54) VIBRATORY DEVICE FOR DISPERSING A TOPDRESSING AND CORRECTING THE GRAIN IN GREENS

(76) Inventor: John L. Humphrey, 327 Willowpointe Dr., St. Charles, MO (US) 63304

( * ) Notice: Subject to any disclaimer, the term of this patent is extended or adjusted under 35 U.S.C. 154(b) by 0 days.

(21) Appl. No.: 09/890,887
(22) PCT Filed: Feb. 7, 2000
(86) PCT No.: PCT/US00/03168
§ 371 (c)(1), (2), (4) Date: Jan. 15, 2002
(87) PCT Pub. No.: WO00/47039
PCT Pub. Date: Aug. 17, 2000

Related U.S. Application Data
(60) Provisional application No. 60/119,449, filed on Feb. 10, 1999.

(51) Int. Cl.[7] .............................................. A01B 49/02
(52) U.S. Cl. ........................................ 172/40; 172/612
(58) Field of Search ............................ 172/40, 94, 35, 172/95, 612, 189, 27–30, 110, 111; 56/16.4 R, 16.4 A, 328.1, 372, 377, 400.02; 15/87, 88

(56) References Cited

U.S. PATENT DOCUMENTS

| | | | | |
|---|---|---|---|---|
| 4,373,227 A | * | 2/1983 | Kimzey et al. | 15/347 |
| 4,989,676 A | | 2/1991 | Rogers | 172/438 |
| 5,018,587 A | | 5/1991 | Gandrud et al. | 172/612 |
| 5,160,034 A | * | 11/1992 | Potter | 209/38 |
| 5,477,927 A | | 12/1995 | Figura | 172/29 |
| 5,547,030 A | | 8/1996 | Takayama et al. | 172/30 |

* cited by examiner

*Primary Examiner*—Christopher J. Novosad
(74) *Attorney, Agent, or Firm*—Grace J. Fishel

(57) ABSTRACT

A vibratory device (10) for dispersing a topdressing and correcting the grain in greens. A deck (30) is supported by a frame (18) with a linkage (36) for raising and lowering the deck (30) with rest to the green. A shaker tray (76) is vibrated within the deck (30) by a vibrator (108) attached to the deck (30). A brush frame (94) is carried within the shaker tray (76) for vibrating against the tips of the grass blades in the green to shake the topdressing into the thatch and to straighten the grass blades. The linkage (36) to raise and lower the deck permits height adjustment of the brush frame (94) with respect to the grass blades so that the brush bristles (106) just tickle the tips minimizing injury to the grass.

10 Claims, 6 Drawing Sheets

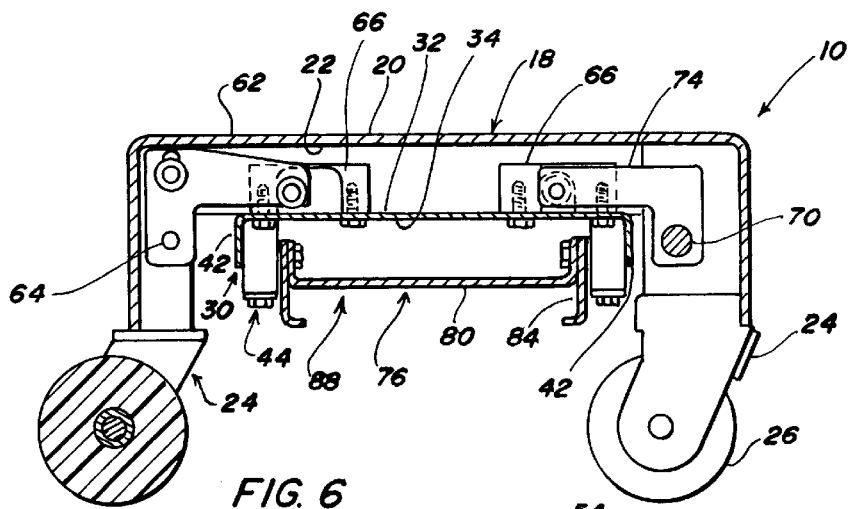
FIG. 6
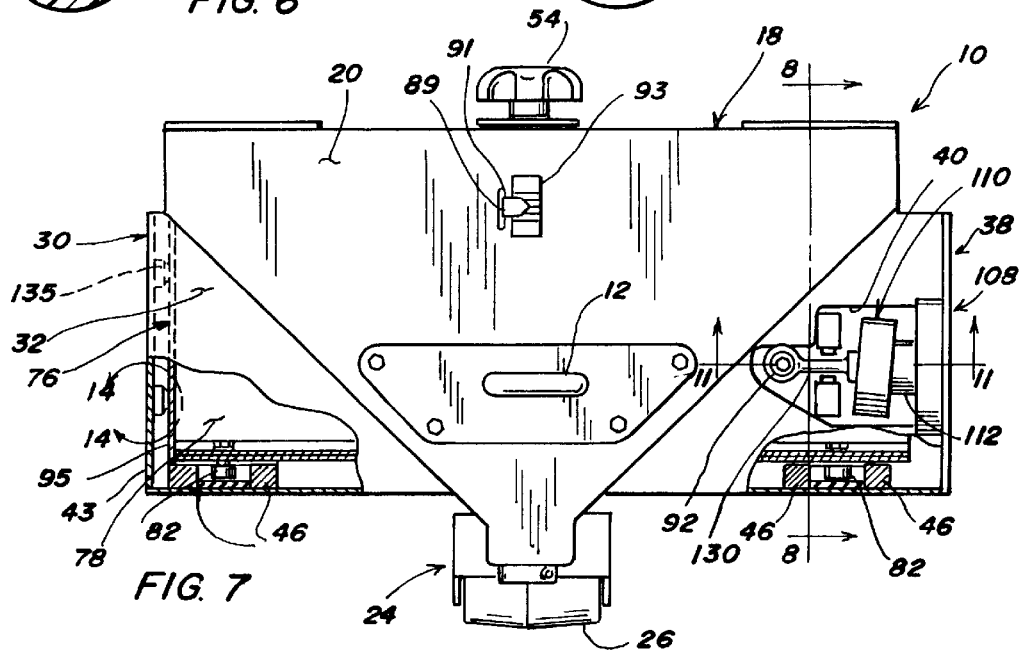
FIG. 7
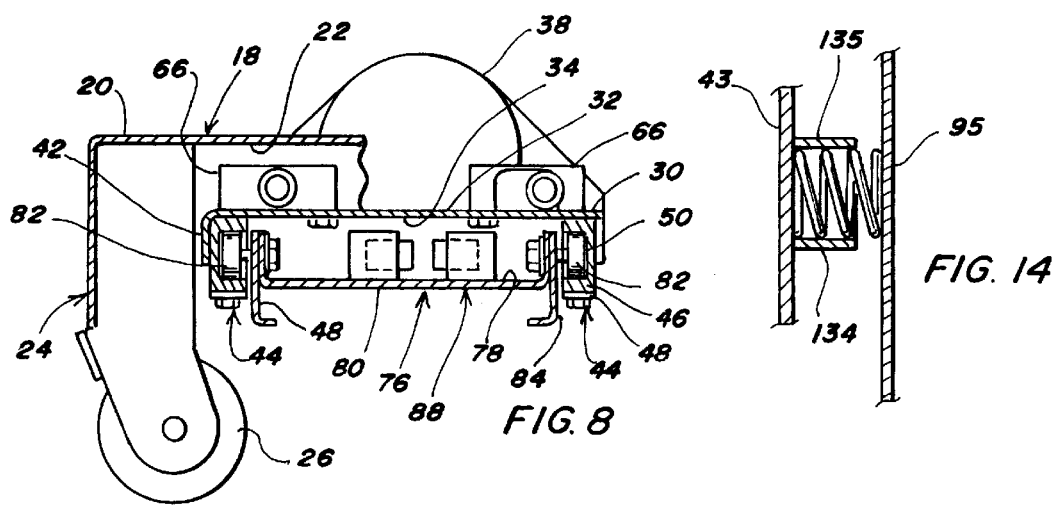
FIG. 8
FIG. 14

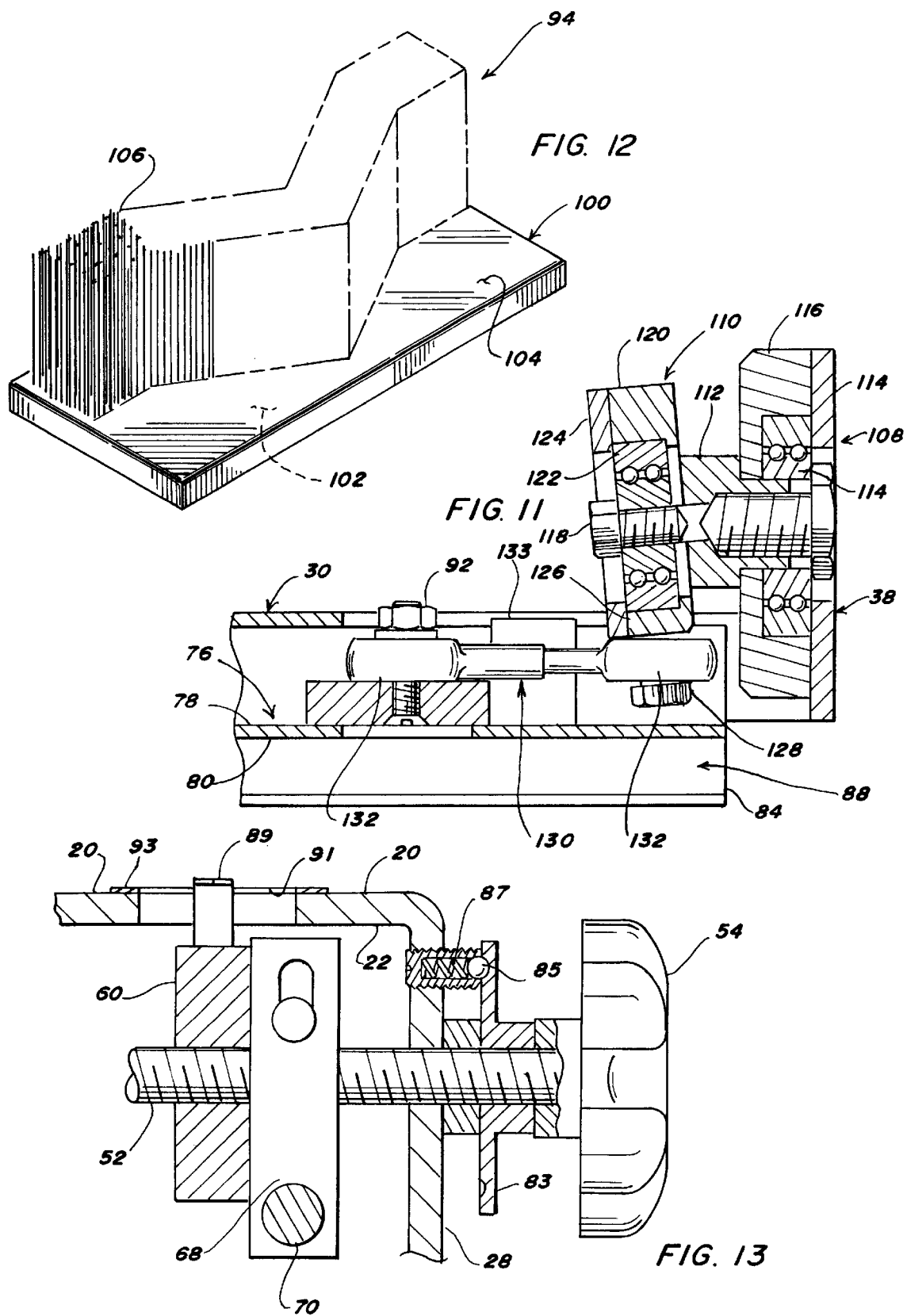

VIBRATORY DEVICE FOR DISPERSING A TOPDRESSING AND CORRECTING THE GRAIN IN GREENS

This application claims priority from provisional patent application Ser. No. 60/119,449, filed Feb. 10, 1999.

BACKGROUND OF THE INVENTION

1. Field of the Invention

The present invention relates to a device for dispersing a topdressing in greens and correcting the grain, while minimizing injury to the grass blades.

2. Brief Description of the Prior Art

In order to promote vigorous growth necessary to maintain a healthy putting green, groundskeepers periodically aerate the turf. Aeration is accomplished by pulling small dirt plugs out of the green with a spike or core aerator. The plugs are cleared away and sand, a sand/peat mixture or some other topdressing is then applied to the putting surface and brushed, swept, or otherwise worked into the holes.

Today, the maintenance program at many golf courses includes topdressing greens at other times during the season. Topdressing may be applied during reconstruction and renovation of older greens and during grow-in of new greens. Frequent topdressings are also applied to established greens to firm the putting surface, improving consistency among the greens. Timely applications of topdressing also help to prevent an undesirable accumulation of thatch in the root zone. A light/frequent topdressing can be used to build a more desirable, sandy growing medium above a native soil profile in existing greens.

A topdressing can be worked into the green by hand with a broom, rake or other similar tool. Incorporating topdressing manually is difficult and labor-intensive. Various prior art devices have been proposed to mechanize the process. Most of these devices, however, tend to brush the sand forward with little or no lateral motion, which can leave ridges and a pile of sand on the collar of the green.

Because the previously known devices move topdressing primarily in the direction of machine travel, it is often necessary to make multiple passes in order to sufficiently incorporate the top dressing. Making multiple passes causes soil compaction, negating the benefits provided by aeration. In addition, dragging brushes linearly over the turf can align the grass in one direction. This set or grain, can cause golf balls to roll differently in one direction as compared to another and increases the tendency of the turf to mat down. Matted turf is disease-prone and is difficult to mow evenly.

There are devices for dispersing topdressings with rotating or reciprocating brushes, but like the devices which move linearly, they tend to bruise the grass blades as the brushes scrub the sand across the green. In addition, the devices with rotating brushes tend to leave a swirly grain in the grass.

Topdressings are preferably applied dry to a relatively dry green as the sand tends to stick to the grass when the topdressing is moist or the grass is wet or dew-covered. Humid or rainy weather also complicates the process. While groundskeepers prefer to apply a dry topdressing to a relatively dry green, this practice interferes with the use of the facility and may not be possible on some busy courses.

Prior art devices for dispersing topdressings are not very effective when the topdressing or grass is slightly wet. Whether the brush is dragged linearly, reciprocated or rotated, the sand tends to stick on the blades as opposed to falling into the thatch. In addition to injuring the grass blades as the sand is worked across the surface, the sand stuck on the grass blades dulls reels and bedknives when the green is mowed. The sand also interferes with the golfers' enjoyment of the course until the sand is worked into the green.

Although there are many problems with topdressing greens, the practice is increasing as the long-term effects of topdressing are positive. What is needed is new equipment that addresses the problems discussed above.

BRIEF SUMMARY OF THE INVENTION

In view of the above, it is an object of the present invention to provide a device for dispersing a topdressing in a manner that causes the sand to settle into the thatch with less bruising of the grass blades. It is another object to provide a device that corrects the grain of the green as it disperses the topdressing. It is also an object to provide a device that is more effective than existing equipment at dispersing a topdressing when the grass is slightly damp, the topdressing moist, the weather humid, etc.

In accordance with the invention, a vibratory device for attachment to a tow vehicle for dispersing a topdressing and correcting the grain in greens, in major part includes: a frame, a deck and a shaker tray with a brush. More particularly, the frame has a top side and a bottom side and is mounted on legs such that the bottom side is elevated above the green. Each leg is mounted on a rotary member for rolling the frame across the green.

The deck has a top side and a bottom side with side rails. The top side of the deck is attached to the bottom side of the frame. The shaker tray has a top side and a bottom side and is adapted to be reciprocated between the side rails of the deck. A vibrator is mounted on the deck and attached to the top side of the shaker tray. The brush has a plurality of bristles and is mounted on the bottom side of the shaker tray. The bristles-disperse the topdressing in the green when vibrated against the grass blades.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 6 is a sectional view taken along line 6—6 in FIG. 4;

FIG. 7 is a plan view of the vibratory device with portions of a deck broken away to show details of a shaker tray and a vibrator to vibrate the tray;

FIG. 8 is a sectional view taken along line 8—8 in FIG. 7;

FIG. 11 is a detail, in cross-section, on an enlarged scale and taken along line 11—11 in FIG. 7 to show details of the vibrator for the tray;

FIG. 12 is a perspective bottom view of a brush frame that is carried by the shaker tray and vibrated against the tips of the grass blades;

FIG. 13 is a detail, in cross-section, on an enlarged scale and taken along line 13—13 in FIG. 5 to show a handle for raising and lowering the deck with a pointer; and, FIG. 14 is a detail, in cross-section, on an enlarged scale and taken along line 14—14 in FIG. 7.

DETAILED DESCRIPTION OF THE INVENTION

Figure 1:
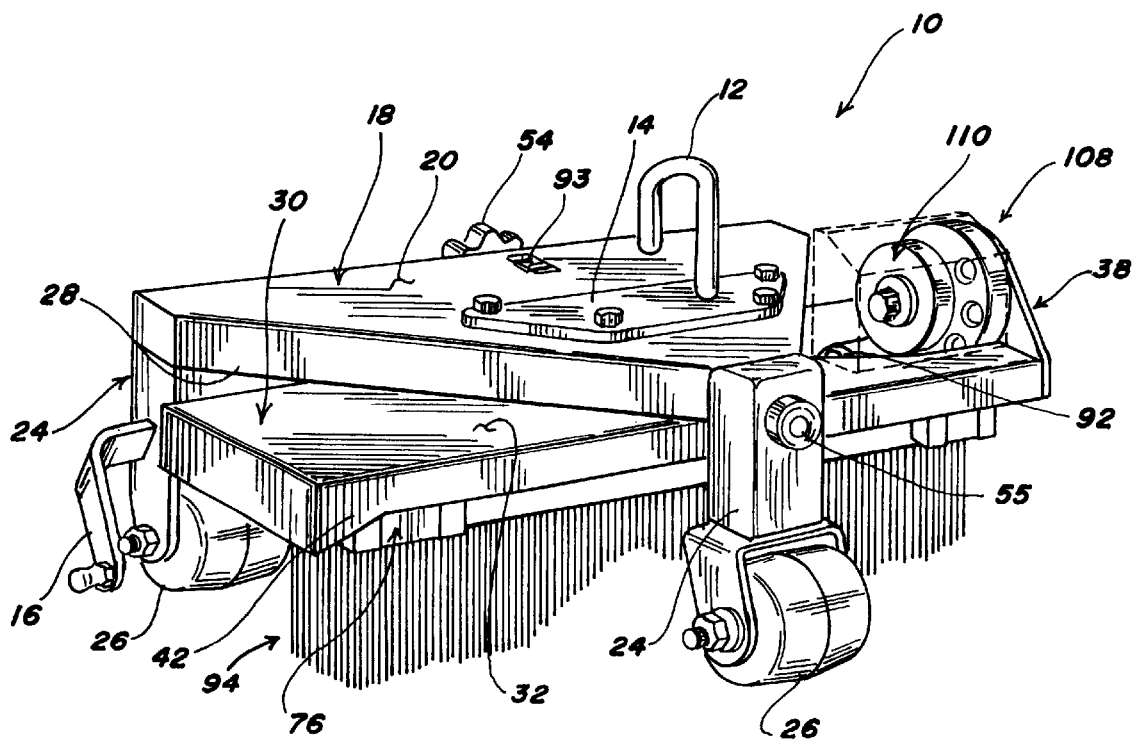
FIG. 1 is a perspective view of a vibratory device for dispersing a topdressing and correcting the grain in golf greens in accordance with the present invention.
Figure 1A:
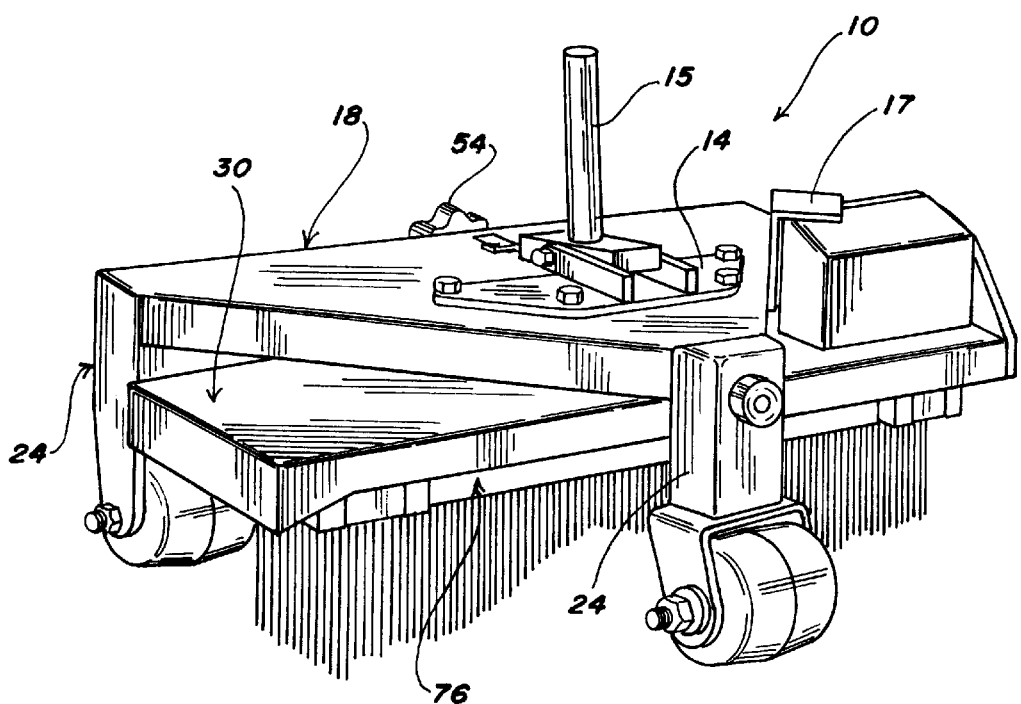
FIG. 1A is a perspective view of the vibratory device shown in FIG. 1 adapted to be towed by a another type of tow vehicle.

Referring to the drawings more particularly by reference character, reference numeral 10 refers to a vibratory device in accordance with the present invention. In FIG. 1, device 10 is viewed from the rear, as it would be seen by an operator seated on a triplex mower or the like, to which it is adapted to be attached. In the form illustrated in the drawings, device 10 is adapted to be towed by a triplex mower of a type having a lift bar and a pull frame. For this purpose a hook 12 mounted on a plate 14 and a pair of tow brackets 1 6 are provided for attachment of device 10 to the mower after the reel cutting units have been removed. It will be understood, however, that device 10 may be easily adapted for attachment to other tow vehicles as shown in FIG. 1A. For example, tow brackets 16 and hook 12 may be removed and plate 14 replaced with another plate 14 having a lift pin 15 and an L-shaped bracket 17, depending on the mower (e.g., Jacobsen versus Toro and so forth). Hence, it will be apparent that the exact nature of the attachment depends upon the construction details of the tow vehicle, which, in addition to triplex mowers, may include other vehicles such as a utility tractor.

Frame

Device 10 has a frame 18 with a top side 20 and a bottom side 22. Frame 18 is mounted on legs 24 such that the bottom side 22 is elevated above the green. Each of legs 24 is mounted on a rotary member 26, such as a roller, for rolling the frame across the green. In the form illustrated in the drawings, frame 18 is a flat, triangular plate with depending side walls forming a skirt 28 around bottom side 22 and with three legs 24 mounted near the vertices. The lower part of legs 24 is preferably U-shaped in cross-section with a roller pinned between the arms thereof. While frame 18 is preferably triangular in shape, it may be rectangular or of any suitable configuration, what is important is that device 10 have three-point suspension so that it floats over any uneven contours of the green.

Deck

Figure 2:
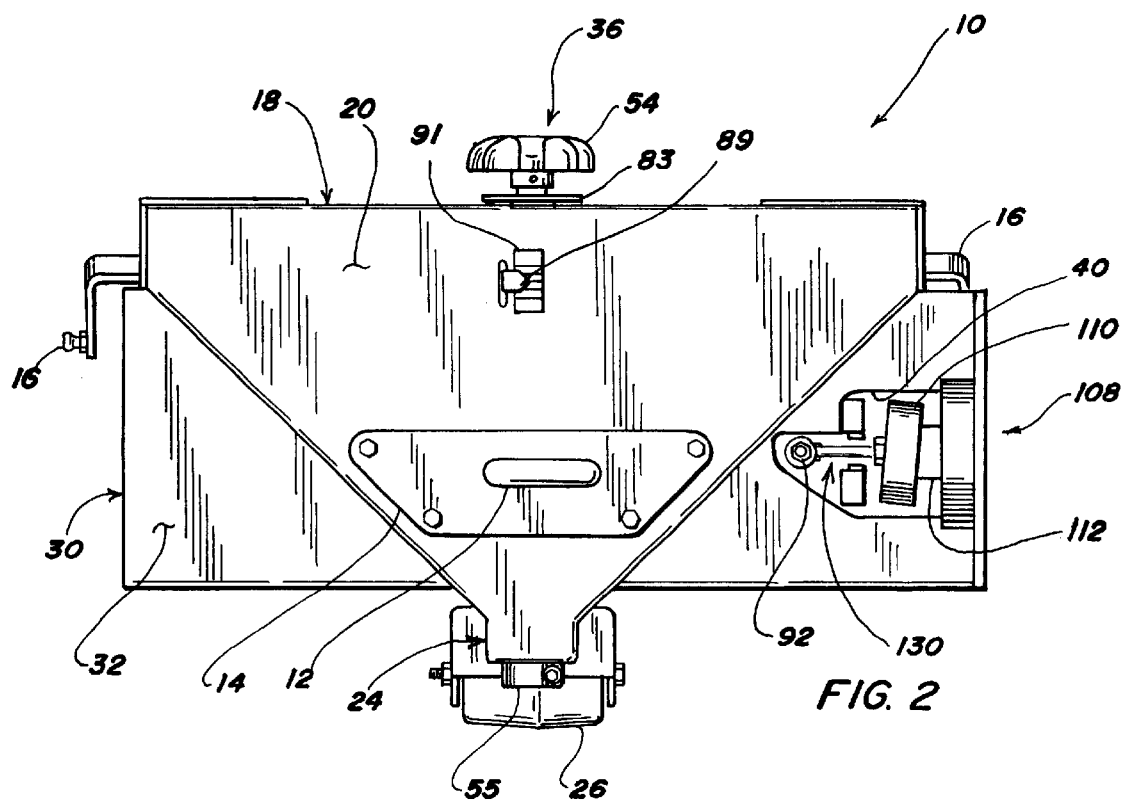
FIG. 2 is a plan view of the vibratory device.
Figure 3:
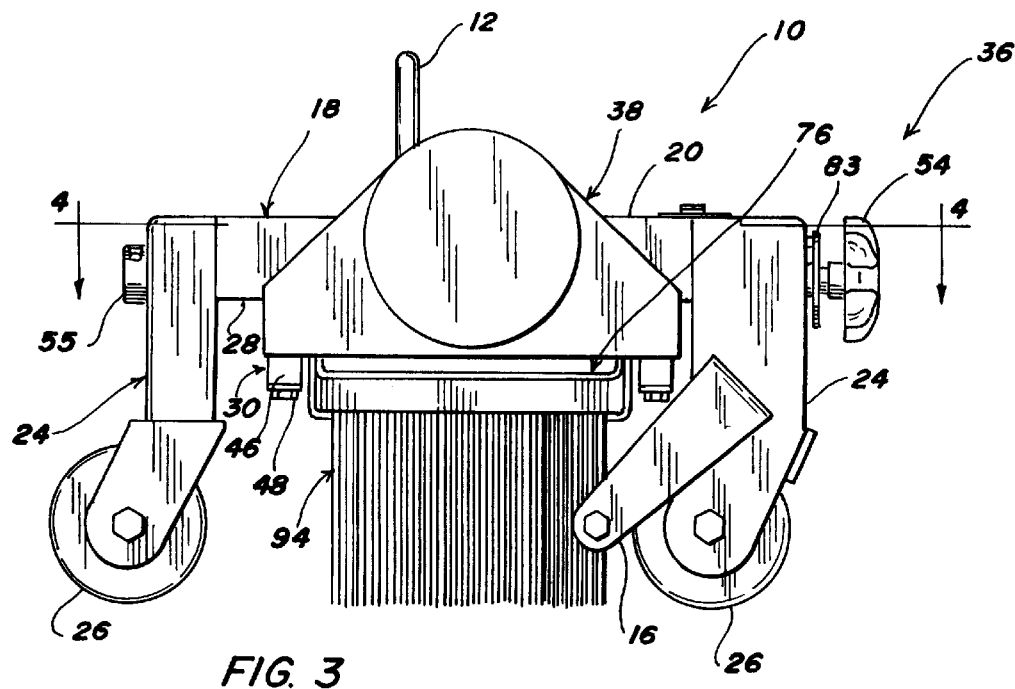
FIG. 3 is a right side elevation of the vibratory device.

A deck 30 is mounted under frame 18, preferably such that it can be raised and lowered with respect to the green. Deck 30 has a top side 32 and a bottom side 34 and is attached to the bottom side 22 of frame 18 with a linkage 36 to raise and lower the deck with respect to the green. A motor mounting plate 38 (FIG. 3) is attached to one end of deck 30 adjacent a cutout 40 (best seen in FIGS. 2 and 4) for use as described below. Deck 30 is generally rectangular with a pair of depending side rails 42 and one end wall 43. Side rails 42 and end wall 43 may be provided as an integral skirt and deck 30 is preferably symmetrical about its longitudinal axis such that it may be reversed right to left in frame 18 so that motor mounting plate 38 is positioned on the left instead of the right when required for adaption to the construction details of the tow vehicle. Attached to side rails 42, at opposite ends thereof, are roller guides 44 (FIG. 8) for use as described below. Each roller guide 44 is formed by a pair of spaced apart blocks 46 attached on the inside of side rails 42 and joined together on the bottom with a retainer plate 48. A nylon glide 50 lines the cavity formed by blocks 46 and retainer plate 48.

Linkage for Raising and Lowering the Deck

Figure 4:
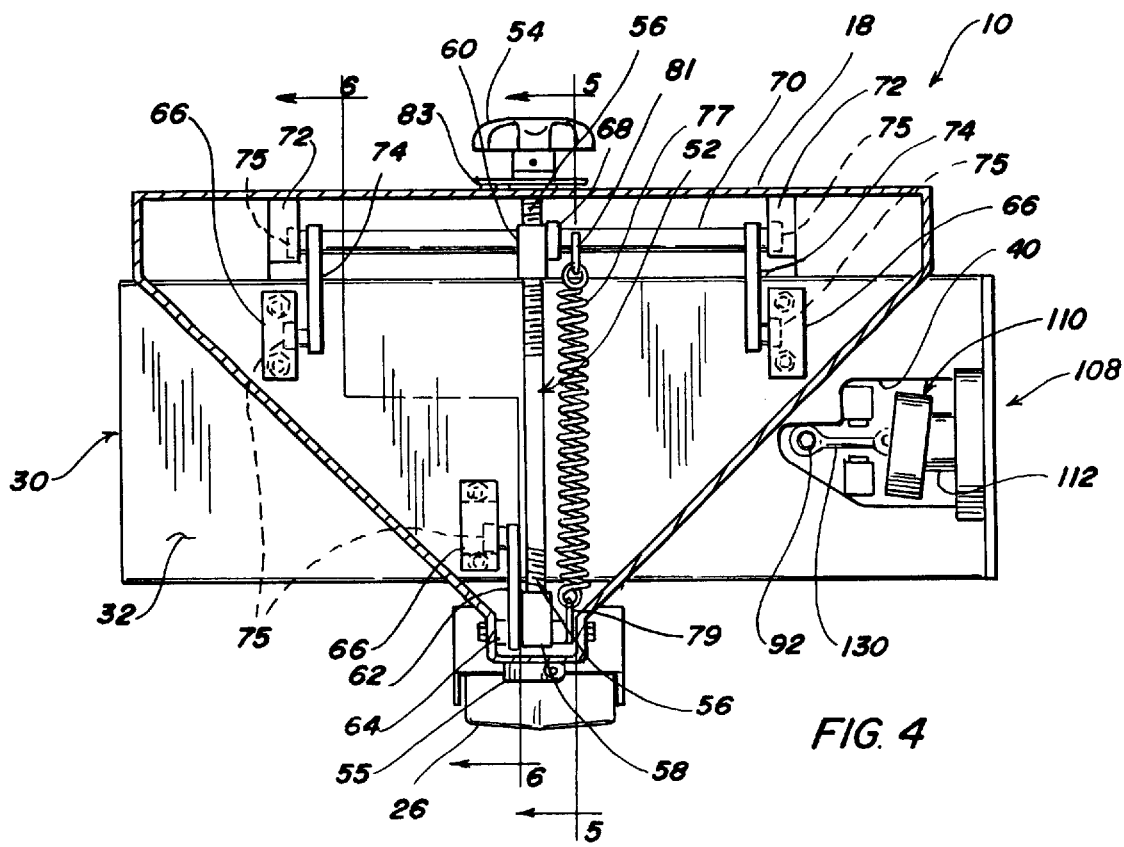
FIG. 4 is a sectional view taken along line 4—4 in FIG. 3.
Figure 5:
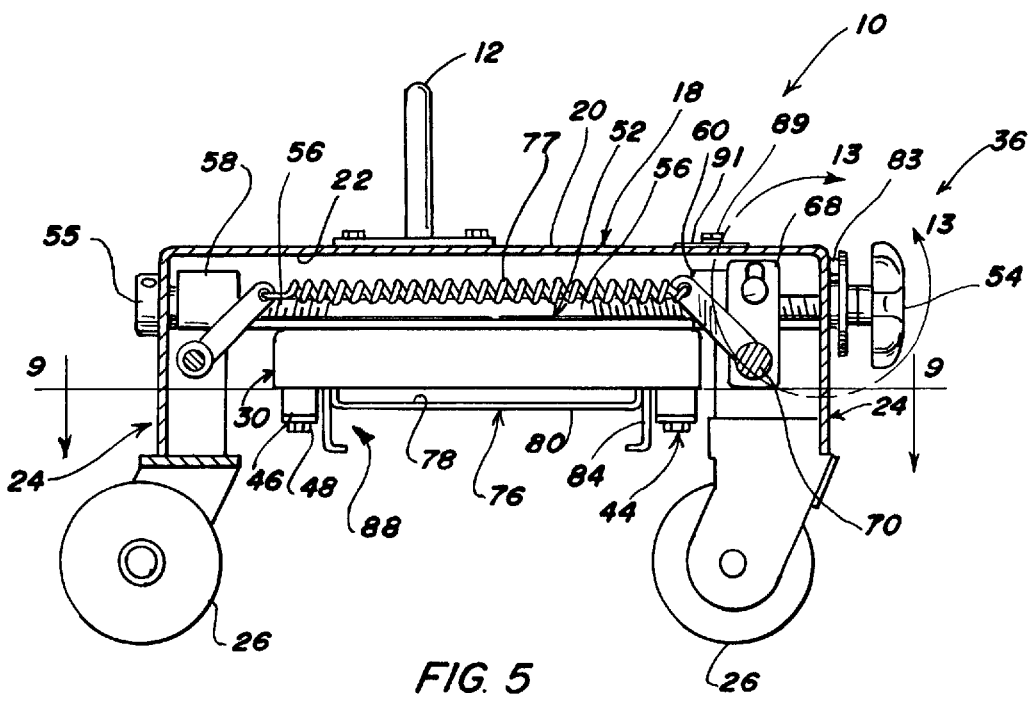
FIG. 5 is a sectional view taken along line 5—5 in FIG. 4.
Figure 9:
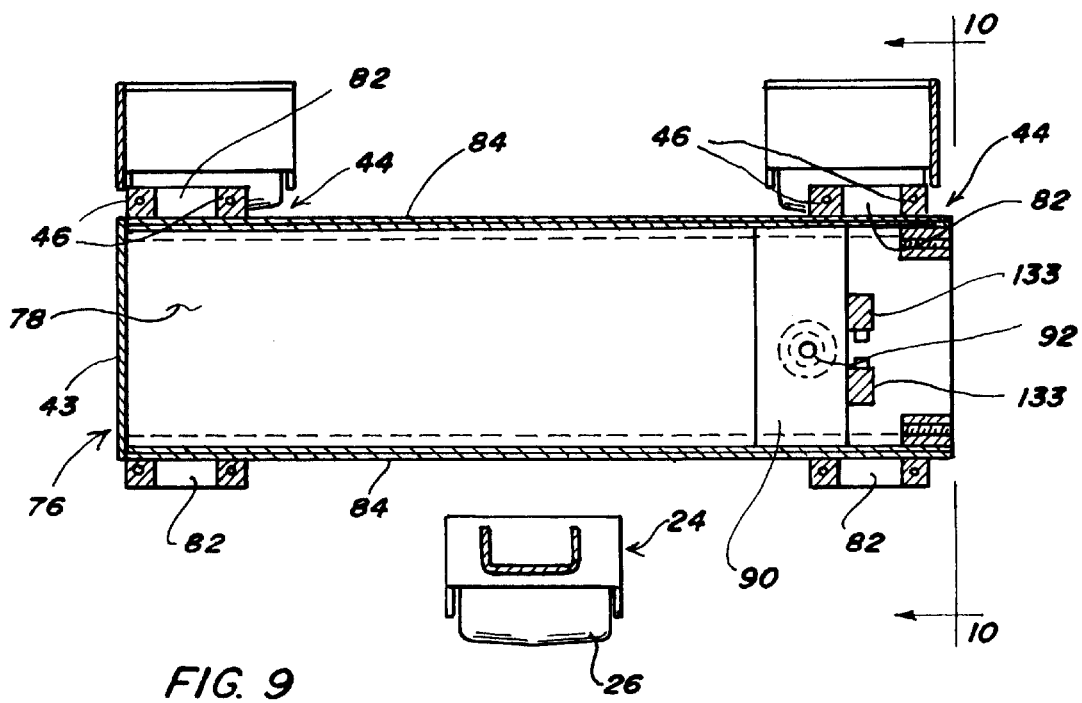
FIG. 9 is a sectional view taken along line 9—9 in FIG. 5.
Figure 10:
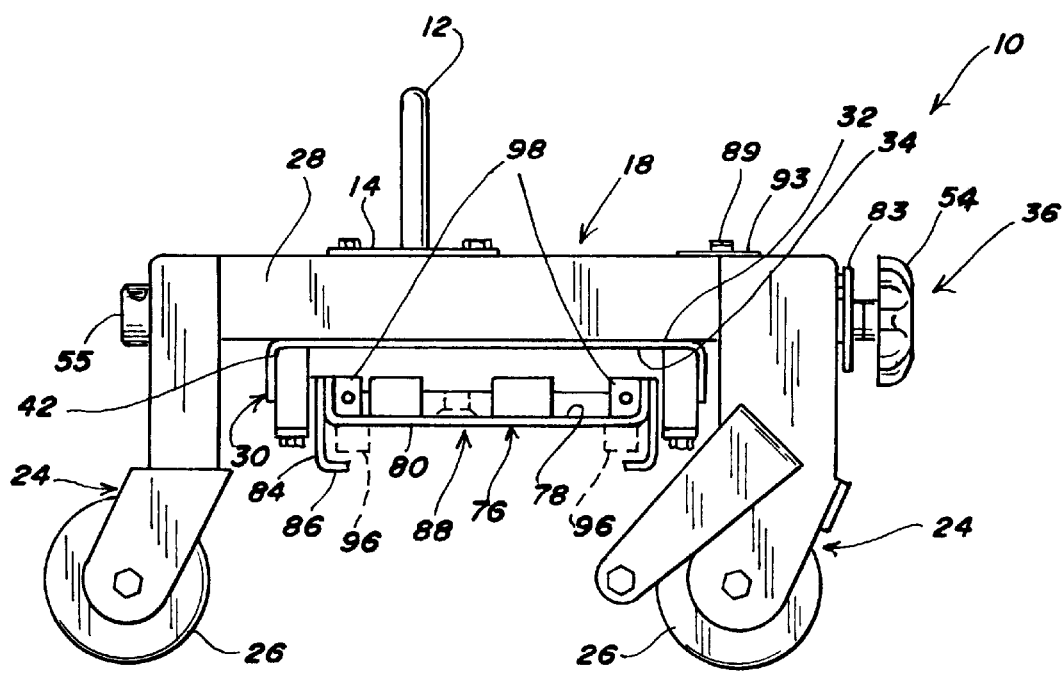
FIG. 10 is a side elevation taken along line 10—10 in FIG. 9.

As shown in FIGS. 4–6, linkage 36 for raising and lowering the deck includes a shaft 52 which is journaled in frame 18 with a first end extending through skirt 28 at the front of device 10 for attachment to a handle 54 and a second end at the rear for attachment of a threaded clamp-on collar 55. Opposite ends of shaft 52 are threaded with threads 56 of opposite hand for engagement of traveling nuts 58, 60 and for engagement of handle 54 and clamp-on collar 55. The threads of traveling nuts 58, 60 are of the same hand as the threads on shaft 52 such that when shaft 52 is rotated with handle 54, traveling nuts 58, 60 move towards and away from each other while clamp-on collar 55 restrains shaft 52 from longitudinal movement. For this to occur, traveling nuts 58, 60 must be restrained from rotating with shaft 52. The center of an L-shaped link 62 is loosely pivoted to nut 58 at the rear of device 10, with one end attached to a rod 64 and the opposite end pivoted to a mounting block 66. Rod 64 is rotated by L-shaped link 62 and is journaled in rear leg 24. A straight link 68 is loosely pivoted to nut 60 at the front of device 10, with the opposite end of the link attached to a rod 70 so that rod 70 rotates with link 68. Opposite ends of rod 70 are pivoted between a pair of blocks 72 attached to skirt 28. A pair of mounting arms 74 are attached to opposite ends of rod 70 at the front of device 10. The other end of each mounting arm 74 is pivoted to two additional mounting blocks 66. Mounting blocks 66 at the front and rear of frame 18 are attached to top side 32 of deck 30. Replaceable nylon bearings 75 are preferably provided in each of mounting blocks 66 and 72 (see FIG. 4). L-shaped link 62 and straight link 68 keep nuts 58, 60 from rotating on shaft 52. By twisting handle 54, shaft 52 and traveling nuts 58, 60 cause deck 30 to be raised and lowered on mounting blocks 66 with respect to the green. A coil spring 77 may be provided to keep backlash out of linkage 36, with spring 77 connected to links 79, 81. Links 79, 81 are welded or the like to rods 64, 70, respectively.

As best seen in FIG. 13, handle 54 may be coupled to a dial plate 83 also attached to shaft 52. Dial plate 83 may include a plurality of dimples 85 facing the outside of skirt 28 for cooperative receipt of a spring biased ball plunger 87. Plunger 87 keeps handle 54 and shaft 52 from accidentally rotating and changing the level of deck 30 with respect to the green. With continuing reference to FIG. 13, as best seen therein, a pointer 89 is attached to traveling nut 60. Pointer 89 extends through a slot 91 provided in top side 20 of frame 18 and references a gage plate 93. Markings on gage plate 93 may be provided such that the distance between adjacent markings correlates with one full rotation of handle 54, or otherwise, for use in positioning deck 30 at some predetermined level.

Shaker Tray

As shown in FIGS. 7–10, a shaker tray 76 with a top side 78 and a bottom side 80 is adapted to be reciprocated between side rails 42 of deck 30. For this purpose, it is preferred that shaker tray 76 be mounted on carriers such as rollers 82 between the side rails 42 of deck 30. Rollers 82 are received in roller guides 44 and ride on nylon glides 50. Shaker tray 76, like deck 30 is generally rectangular and has side rails 84. Side rails 84 have inwardly directly toes 86, forming a slot 88 between bottom side 80 and side rails 84 for use as described below. As shown in the drawings, the base of shaker tray 76 is U-shaped in cross section and side rails 84 are L-shaped and attached to the sidewalls of the shaker tray base. An end wall 95 interconnects side rails 84 and a transverse reinforcing strap 90 may be attached to top side 78 near one end of the tray. A bolt 92, for use as described below, is passed from bottom side 80 to top side 78 through a hole provided in strap 90 and the base of shaker tray 76.

Brush Frame

A brush frame 94 (seen in FIGS. 1, 3 and 12) is received in slot 88, one end of which is closed by wall 95, while the other end of which is blocked with clips 96 attached to blocks 98 (FIG. 10) provided on top side 78 of shaker tray 76. Brush frame 94 (FIG. 12) has a headboard 100 with a top side 102 and a bottom side 104. A plurality of bristles 106 are arranged in rows on bottom side 104 of headboard 100. The rows are preferably batwing in shape and extend substantially across headboard 100. As shown in FIG. 12, the number of bristles at the ends of the rows is the same as in the middle. With a V-shape, as compared to a batwing configuration, there are fewer bristles at the ends of the "V" so that the brush wears on the ends and does not disperse the topdressing as well. The batwing configuration overcomes this problem and is more efficient than a straight brush at moving the sand into the aeration holes. It is preferred that different brush frames 94 be provided with bristles 106 of different diameter. For example, a brush frame 94 with bristles having a diameter of 0.0015 inch may be provided for use in grain correction, whereas a brush frame with bristles having a diameter of 0.0030 or 0.0045 inch provide more aggressive action and may be used for knocking wet sand off the grass blades. It should be understood that these examples are set forth by way of illustration, not limitation.

Vibrator for the Shaker Tray

A vibrator 108 is attached to deck 30 and top side 78 of shaker tray 76 to vibrate the shaker tray in the deck. As best seen in FIGS. 7 and 11, vibrator 108 may include a wobble plate 110 mounted at an angle on a shaft 112 and rotated by a rotary motor (not shown) attached to motor mounting plate 38. As defined herein, the rotary motor includes any source of mechanical rotating power including a hydraulic motor, a hydrostatic motor, a gasoline engine, an electric motor, a power take-off connection or the like. Rotary motor has a horizontal output shaft that is connected to stub shaft 112 journaled within a bearing 114 in a base 116 attached to motor mounting plate 38. Bearing 114 is preferably a double row bearing, as shown in FIG. 11. A free end of stub shaft 112 is cut at an angle between about 2 and 10 degrees, preferably between about 3 and 7 degrees and is tapped for receipt of a bolt 118.

With continuing reference to FIG. 11, bolt 118 attaches wobble plate 110 to stub shaft 112. Wobble plate 110 includes a wobble ring 120 into which is press fit a bearing 122. Bearing 122 is retained within wobble ring 120 by an attachment plate 124 which is joined to wobble ring 120 with bolt 118. Bearing 122, like bearing 114, is preferably a double row bearing, as shown in FIG. 11. A flat 126 is formed on wobble plate 110 and tapped for receipt of a bolt 128 for attachment of a linkage 130 for connecting wobble plate 110 to shaker tray 76. Linkage 130 passes through cutout 40 in deck 30. When bolt 128 in wobble ring 120 is 1½ inches from the center of stub shaft 112, wobble plate 110 will vibrate about ¼ inch in a plane parallel to the long axis of shaker tray 76. As stub shaft 112 rotates in bearing 114, wobble plate 110 also rocks from side to side, which motion results in a misalignment of linkage 130 connecting bolt 92 in shaker tray 76 with bolt 128 in wobble ring 120. This misalignment can be compensated for when linkage 130 is outfitted with spherical rod ends 132. A pair of cushioning blocks 133 may be provided on shaker tray 76, flanking linkage 130 to keep the linkage from swinging from left to right. Each cushioning block 133 may be made from a stick of hard rubber or other suitable elastomeric material extending out of a block. One or more springs 134, each of which housed in a hollow boss 135 on the inside of end wall 43 of deck 30 (see FIGS. 7 and 14), take the pressure off spherical rod ends 132, by pushing against end wall 95 of shaker tray 76 as an assist on the return stroke. Other suitable linkages 130, as will occur those skilled in the art, may be used to compensate for the aforementioned misalignment.

Use

Before vibratory device 10 is used, a topdressing is applied to a green with a sand distributor or spreader. A large amount of topdressing may be applied after aeration to fill the holes left by the aeration process. Throughout the season, smaller amounts of topdressing, sometimes just a dusting, may be applied as frequently as once a week to control the thatch and to make the greens faster. In all instances, vibratory device 10 disperses the topdressing into the thatch with much less damage to the blades of grass than was possible before.

With prior art devices for dispersing the topdressing, the sand is bulldozed across the green and ground into the grass with brushes that either drag or scrub. As the topdressing is dispersed, the sand bruises the blades of grass, which are made more susceptible to disease or burning. When a down pressure is applied, the prior art devices may even dig sand out of the thatch.

Hydraulic motors driven off a triplex mower typically operate at 2,000 rpm. When the rotary motor used with device 10 is such a motor, shaker tray 76 makes 2,000 vibrations per minute. By using handle 54 for raising and lowering deck 30 with respect to the green, it is possible to operate device 10 such that bristles 106 just tickle the tips of the grass blades and the vibrations cause the sand to fall into the thatch. An additional benefit is that as device 10 disperses the topdressing, it also corrects the grain as bristles 106 leave the grass blades in an upright position.

By using the height adjustment, device 10 may be operated in such a manner that the topdressing is not dragged or scrubbed through the green. The grass blades are less bruised and the sand is not disturbed in the thatch. Since the sand is shaken off the grass blades, the topdressing does not dull a mower when the green is mowed or interfere with the golfers' enjoyment of the course. Device 10 can be used to disperse topdressing even when the topdressing is somewhat moist or the grass slightly wet. This is particularly important when topdressings are being frequently applied as it is desirable to do the work during the night or in the early morning to avoid interrupting play.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A vibratory device for attachment to a tow vehicle for dispersing a topdressing and correcting the grain in greens, said device comprising:

a frame having a top side and a bottom side, said frame mounted on legs such that the bottom side is elevated above the green, each leg mounted on a rotary member for rolling the frame across the green;

a deck with a top side and a bottom side, said top side of the deck attached to the bottom side of the frame, said bottom side of the deck having a pair opposed side rails;

a shaker tray with a top side and a bottom side, said shaker tray adapted to be reciprocated between the side rails of the deck, said shaker tray having a pair of opposed side rails in which is mounted a brush with a plurality of bristles;

a vibrator attached to the frame and the top side of the shaker tray to vibrate the shaker tray in the deck, whereby the bristles in the brush are vibrated against the grass blades in the green.

2. The device of claim 1 with a linkage attached to the frame for raising and lowering the deck with respect to the green.

3. A vibratory device for attachment to a tow vehicle for dispersing a topdressing and correcting the grain in greens, said device comprising:

a frame having a top side and a bottom side, said frame mounted on legs such that the bottom side is elevated above the green, each leg mounted on a rotary member for rolling the frame across the green;

a deck with a top side and a bottom side, said top side of the deck attached to the bottom side of the frame with a linkage for raising and lowering the deck with respect to the green, said bottom side of the deck having a pair opposed side rails;

a shaker tray with a top side and a bottom side mounted on carriers between the side rails of the deck, said shaker tray having a pair of opposed side rails;

a vibrator attached to the frame and the top side of the shaker tray to vibrate the shaker tray in the deck, a brush frame with a plurality of bristles mounted between the side rails of the shaker tray, said bristles vibrated against the grass blades in the green.

4. The device of claim 3 wherein the linkage for raising and lowering the deck comprises a threaded shaft journaled in the frame with oppositely threaded ends, a pair of traveling nuts threaded on said threaded ends, each of said nuts pivoted to a link having one end that is mounted on a rod journaled in the frame, said rod pivotally connected by said link or by a pair of arms to a mounting block attached to the top side of the deck whereby rotating the shaft causes the deck to be raised and lowered by said mounting blocks with respect to the green.

5. The device of claim 3 wherein the vibrator for the shaker tray comprises a wobble plate driven by a stub shaft with a free end cut at an angle, said stub shaft connected to a motor through a motor mounting plate attached to the deck, said wobble plate connected to the shaker tray with a linkage.

6. The device of claim 3 wherein the brush frame comprises a headboard with a top and bottom side, a plurality of bristles arranged in rows on the bottom side of the headboard, said rows being batwing in shape and extending substantially across the headboard.

7. A vibratory device for attachment to a tow vehicle for dispersing a topdressing and correcting the grain in greens, said device comprising:

a frame having a top side and a bottom side, said frame mounted on legs such that the bottom side is elevated above the green, each leg mounted on a rotary member for rolling the frame across the green;

a deck with a top side and a bottom side, said top side of the deck attached to the bottom side of the frame with a linkage for raising and lowering the deck with respect to the green, said bottom side of the deck having a pair opposed side rails;

a shaker tray with a top side and a bottom side mounted on carriers between the side rails of the deck, said shaker tray having a pair of opposed side rails;

a vibrator attached to the frame and the top side of the shaker tray to vibrate the shaker tray in the deck, said vibrator comprising a wobble plate driven by a stub shaft with a free end cut at an angle, said stub shaft connected to a motor through a motor mounting plate attached to the deck, said wobble plate connected to the shaker tray with a rod with spherical rod ends; and, a brush frame with a plurality of bristles mounted between the side rails of the shaker tray, said bristles vibrated against the grass blades in the green.

8. The device of claim 7 wherein the deck and the shaker tray have an end wall between the side rails, a hollow boss with a coil spring is attached to the inside of the end wall of the deck to take the pressure off the spherical rod ends by pushing against the end wall of the shaker tray.

9. The device of claim 7 wherein the linkage for raising and lowering the deck comprises a threaded shaft journaled in the frame with oppositely threaded ends, a pair of traveling nuts threaded on said threaded ends, each of said nuts pivoted to a link having one end that is mounted on a rod journaled in the frame, said rod pivotally connected by said link or by a pair of arms to a mounting block attached to the top side of the deck whereby rotating the shaft causes the deck to be raised and lowered by said mounting blocks with respect to the green.

10. The device of claim 9 wherein a second link is attached to each of the rods pivotally connected to the traveling nuts by the first links, said device further including a coil spring interconnecting the second links to keep backlash out of the traveling nuts threaded on the threaded shaft.

* * * * *